United States Patent [19]

Kawasumi et al.

[11] Patent Number: 5,547,499
[45] Date of Patent: Aug. 20, 1996

[54] AQUEOUS INK COMPOSITION

[75] Inventors: Toshimitsu Kawasumi, Osaka; Hiroaki Ueda, Daito, both of Japan

[73] Assignee: Sakura Color Products Corporation, Osaka, Japan

[21] Appl. No.: 443,448

[22] Filed: May 18, 1995

[30] Foreign Application Priority Data

Jun. 1, 1994 [JP] Japan .................. 6-143860
Jun. 29, 1994 [JP] Japan .................. 6-171657

[51] Int. Cl.$^6$ .................................................. C09D 11/02
[52] U.S. Cl. ..................... 106/20 R; 106/23 A; 106/498
[58] Field of Search ........................ 106/20 R, 23 H, 106/498

[56] References Cited

U.S. PATENT DOCUMENTS

| | | | |
|---|---|---|---|
| 3,838,063 | 9/1974 | Foss | 106/498 |
| 4,222,788 | 9/1980 | Liedek et al. | 106/498 |
| 5,122,404 | 5/1992 | Sommer et al. | 106/498 |

*Primary Examiner*—Helene Klemanski
*Attorney, Agent, or Firm*—Armstrong, Westerman, Hattori, McLeland & Naughton

[57] ABSTRACT

An aqueous ink composition is provided which includes an aqueous mixture containing at least a coloring agent, a pigment dispersant, a water-soluble organic solvent and water, and an organic white pigment of an alkylene-bis-melamine derivative represented by the general formula (1):

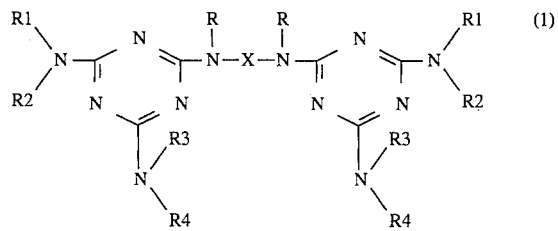

wherein R represents a hydrogen atom, a lower alkyl group having 1 to 4 carbon atoms or an alicyclic group; R1, R2, R3 and R4 are the same or different, each representing a hydrogen atom or a lower alkyl group having 1 to 4 carbon atoms; R1 and R2, or R3 and R4 may form a heterocyclic group together with a nitrogen atom; and X represents a lower alkylene group having 2 to 3 carbon atoms. The aqueous ink composition is particularly useful for writing instruments of direct ink supply type and of wick type.

10 Claims, No Drawings

AQUEOUS INK COMPOSITION

BACKGROUND OF THE INVENTION

1. Field of the Invention

The present invention relates to aqueous ink compositions for use in writing instruments such as of direct ink supply type or of wick type. More particularly, the present invention relates to aqueous ink compositions capable of exhibiting their intrinsic deep colors such as navy blue, violet, green and brown even on black paper for use in writing instruments of direct ink supply type having an ink container tube directly connected therewith and/or provided with an ink flow adjusting mechanism, through which ink container tube the ink remaining therein is visible, and further to aqueous ink compositions free from clogging at a writing tip even after prolonged use and excellent in concealing power for use in writing instruments of wick type.

2. Related Arts

Writing instruments of so-called direct ink supply type have a transparent ink container adapted to be directly charged with ink for storage and a ball-point tip, felt tip or the like writing tip. Writing instruments of wick type have a wick formed of a bundle of fibers with its periphery covered with a resin or the like and impregnated with ink, from which the ink is supplied to a ball-point tip, felt tip or the like writing tip through capillarity.

It has been a conventional practice to prepare an aqueous ink composition for use in such writing instruments by adding a water-soluble organic solvent of a polyvalent alcohol or a derivative thereof to an aqueous solution containing a water-soluble dye or a water-dispersible pigment.

However, a conventional aqueous ink composition prepared by adding thereto a certain pigment for impartation of a deep color fails to exhibit its intrinsic color on black paper because the color of the ink is assimilated with the black of the paper. An ink composition of a deep color applied to a transparent ink container tube of a refill for the writing instruments of direct ink supply type exhibits a deeper color in the container tube than that it exhibits on paper. Specifically, an ink composition of navy blue, violet, green, brown or the like looks almost black in the container tube, making it impossible to visually recognize the color thereof through the transparent ink container tube. Attempts have been made to overcome the aforesaid drawbacks by adding titanium oxide to an ink composition. However, the ink composition containing titanium oxide suffers from clogging at the writing tip of a writing instrument, because titanium oxide has a high specific gravity and cannot be rendered into fine particles. Thus, a satisfactory solution to the problem is yet to be found.

For application to the writing instruments of wick type, there has been proposed an aqueous ink composition to which titanium oxide is added to impart thereto concealing power. If a writing instrument charged with such ink composition is allowed to stand with its writing tip oriented downward for a long time, however, titanium oxide having a high specific gravity precipitates into the writing tip to cause clogging and thus the instrument is disabled for use. To solve this problem, Japanese Unexamined Patent Publications No. 63-145380 (1988), No. 63-145382 (1988) and No. 2-133479 (1990) disclose aqueous pigment ink compositions containing titanium oxide along with a hollow resin emulsion called "plastic pigment", all of which have a reduced concealing power compared with that of an ink composition not containing the hollow resin emulsion.

It is, therefore, an object of the present invention to provide an aqueous ink composition which assures long-term stability in dispersibility while maintaining an excellent concealing power, and is free from clogging at a writing tip even after a long-term storage, and the color of which can be recognized through a transparent ink container.

SUMMARY OF THE INVENTION

As a result of intensive study to solve the foregoing problem, the present inventors have found that the problems associated with the conventional ink compositions can be solved by providing an aqueous ink composition including an organic white pigment of an alkylene-bis-melamine derivative represented by the following general formula (1) and an aqueous ink mixture containing at least a coloring agent, a pigment dispersant, a water-soluble organic solvent and water.

In accordance with the present invention, there is provided an aqueous ink composition comprising an aqueous ink mixture containing a coloring agent, a pigment dispersant, a water-soluble organic solvent and water, and an organic white pigment of an alkylene-bis-melamine derivative represented by the general formula (1):

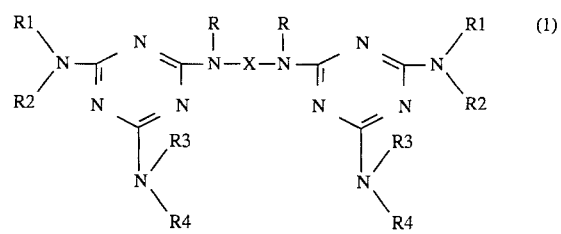

wherein R represents a hydrogen atom, a lower alkyl group having 1 to 4 carbon atoms or an alicyclic group; R1, R2, R3 and R4 are the same or different, each representing a hydrogen atom or a lower alkyl group having 1 to 4 carbon atoms; R1 and R2, or R3 and R4 may form a heterocyclic group together with a nitrogen atom; and X represents a lower alkylene group having 2 to 3 carbon atoms.

The aqueous ink composition is particularly useful for writing instruments of direct ink supply type and of wick type.

DESCRIPTION OF THE PREFERRED EMBODIMENTS

The present invention will hereinafter be described in detail.

Applicable to the present invention as an organic white pigment is a compound of the general formula (1) wherein R is a substituent selected from the group consisting of a hydrogen atom, methyl group, ethyl group, propyl group and butyl group. R1, R2, R3 and R4 may be the same or different and each represent a hydrogen atom, methyl group, ethyl group, propyl group or butyl group. R1 and R2, or R3 and R4 may form together with a nitrogen atom a heterocyclic group such as a piperidyl group and morpholino group. X may be an ethylene group or propylene group.

The content of the organic white pigment of the general formula (1) is preferably 1% by weight to 20% by weight with respect to the total amount of the aqueous ink composition for a writing instrument of direct ink supply type. If the content thereof is less than 1% by weight, the resultant ink composition does not have a satisfactory coloration effect. If the content exceeds 20% by weight, the resultant ink composition, which may sometimes contain a pseudo-plasticity formation agent when used in a writing instrument of direct ink supply type, has an excessively high viscosity and, hence, deteriorates writing smoothness. For use in the writing instrument of wick type, the pseudo-plasticity formation agent is rarely added to an ink composition unlike that for use in the writing instrument of direct ink supply type, and therefore, the content of the organic white pigment is preferably 1% by weight to 40% by weight, more preferably 5 % by weight to 25% by weight with respect to the total amount of the aqueous ink composition. If the content thereof is less than 1% by weight, the resultant ink composition does not exhibit a satisfactory concealing power. If the content thereof exceeds 40% by weight, the resultant ink composition has an increased viscosity and, hence, deteriorates writing smoothness.

Of the aforesaid organic white pigments represented by the general formula (1), a known organic white pigment of ethylene-bis-melamine represented by the following formula (2) is preferable, which is available from Hakkol Chemical Inc. under a trade name of SHIGENOX-OWP.

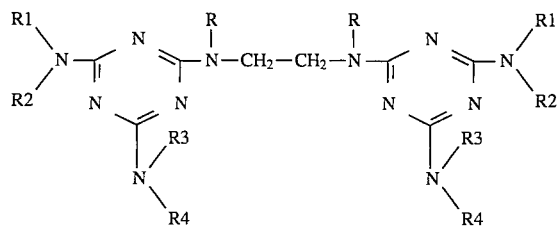

The pigment for use in the aqueous ink composition of the present invention may be any of various kinds of known pigments. Examples of pigments include organic pigments such as azo-type, condensed polyazo-type, phthalocyanine-type, quinacridone-type, anthraquinone-type, dioxazine-type, indigo-type, thioindigo-type, perinone-type and perylene-type pigments; inorganic pigments such as carbon black; and colored resin emulsions such as prepared by coloring an aqueous dispersion of fine polymer particles of an average particle diameter of 0.1 to 1 um obtained by emulsion polymerization of one or more resins selected from styrene resins, acrylic resins, acrylonitrile resins, polymethylmethacrylate resins and polyvinyl chloride resins with a basic dye or fluorescent basic dye and/or a fluorescent brightener. These may be used either alone or as a mixture. To enhance the concealing power of the aqueous ink composition for the writing instruments of wick type, titanium oxide may be added as a pigment in combination with the aforesaid organic white pigment.

The amount of the pigment to be used is preferably in the range between 1% and 30% by weight, more preferably between 3% and 20% by weight with respect to the total amount of the aqueous ink composition. When the colored resin emulsion is used, the amount thereof is preferably in the range between 10 % and 50% by weight with respect to the total amount of the aqueous ink composition. If the amount thereof is less than the aforesaid range, the ink density on paper is undesirably reduced. On the other hand, if the amount thereof is greater than the aforesaid range, the resultant ink has an increased viscosity and, hence, deteriorates writing smoothness.

If a pigment or a fluorescent colored resin emulsion is used as a coloring agent in the present invention, a pigment dispersant is used. The pigment dispersant comprises at least one selected from generally used water-soluble resins, surface active agents and the like. Although the water-soluble resins maybe selected from natural resins, semisynthetic resins or synthetic resins, the synthetic resins are the most preferable in terms of fungi- and rot-resistance and viscosity characteristics of the ink for writing instruments. Examples of such synthetic resins include water-soluble acrylic resins, cross linked acrylic resins, water-soluble maleic acid resins, water-soluble styrene resins, water-soluble styrene-acrylic resins, water-soluble styrene-maleic acid resins, polyvinyl pyrrolidone, polyvinyl alcohol and water-soluble urethane resins. In particular, an alkali or ammonia salt or amine of α-methylstyrene-acrylic acid copolymer is preferable as the pigment dispersant. The surface-active agent for use in the present invention is any one selected from anionic surface-active agents, cationic surface-active agents, nonionic surface-active agents and ampholytic surface-active agents. The content of such a dispersant is preferably in the range between 0.05 parts and 2 parts by weight with respect to 1 part by weight of the pigment. Particularly for use in the ink composition for the writing instruments of wick type, the content thereof is preferably in the range between 0.2 parts and 0.5 parts by weight. If the content is less than the aforesaid range, the dispersion stability of the pigment is reduced. On the other hand, if the content is greater than the aforesaid range, the resultant ink composition has an increased viscosity and, hence, deteriorates writing smoothness.

For use in the writing instruments of direct ink supply, it may be desirable that the aqueous ink composition contains a water-soluble dye. The water-soluble dye may be any one of dyes conventionally used for an aqueous ink, such as acid dyes including C. I. acid red 87, C. I. acid orange 56, C. I. acid violet 49 and C. I. acid blue 9; direct dyes including C. I. direct yellow 50 and C. I. direct black 19; and basic dyes including C. I. basic blue 9, C. I. basic red 1 and C. I. basic yellow 35. These may be used either alone or in combination. The amount of such a water-soluble dye to be used is preferably in the range between 0.1% and 30% by weight, more preferably between 1% and 20% by weight with respect to the total amount of the aqueous ink composition.

Examples of water-soluble organic solvents include polyvalent alcohols such as ethylene glycol, diethylene glycol, propylene glycol and glycerin; glycol ethers such as propylene glycol monomethyl ether; and glycol ether esters such as propylene glycol monomethyl ether acetate. These may be used either alone or as a mixture. The content of such water-soluble organic solvent is preferably in the range between 1% and 40% by weight with respect to the total amount of the ink composition. If the content thereof is less than the aforesaid range, the resultant ink dries too fast at a writing tip, leading to an unclear line drawn on paper. On the other hand, if the content is greater than the aforesaid range, the resultant ink dries too slow on paper.

As required, the ink composition may contain an appropriate pH adjuster, lubricant, rust-preventive agent, antiseptic agent, antifungal agent and the like.

For use in the writing instruments of direct ink supply type, it is desirable that the ink composition may contain a pseudo-plasticity formation agent, which is not particularly an essential ingredient, because the writing instrument of this type comprises an ink container tube adapted to be directly charged with ink. Usable as the pseudo-plasticity formation agent are natural polysaccharides and semisynthetic cellulosic polymers selected from generally used water-soluble polymers. More specifically, exemplary natural polysaccharides include guar gum, locust bean gum, weran gum, rhamzan gum, xanthan gum and the like, which have polymeric structure such as obtained by polymerization of monosaccharides such as glucose, galactose, rhamnose, and a glucuronic acid salt. Among these, weran gum and xanthan gum are particularly preferable.

Examples of specific pH adjusters for use in the present invention include caustic soda, sodium carbonate, alkanolamine and ammonia. The pH of the ink composition is preferably in the range between 8 and 10 in terms of the solubility of the dispersant or the dispersibility of the pigment, but is not particularly limited to this range.

Usable as the lubricant are alkali and amine salts of N-acyl amino acid-based, ether carboxylic acid-based and N-acyl tauric acid-based active agents, alkali and alkanolamine salts of fatty acids, and phosphate-based surface-active agent.

Examples of specific rust-preventive agents usable in the present invention include benzotriazole, derivatives thereof and dicyclohexylammonium nitrate. Examples of specific antiseptic agents are potassium sorbate, sodium benzoate, pentachlorephenyl sodium, sodium dihydroacetate and 1,2-benzisothiazoline-3-on. Among these, 1,2-benzisothiazoline-3-on is particularly preferable.

For the application to the writing instrument of direct ink supply type, exemplary forms of an ink container particularly appreciating the effects of the ink composition of the present invention are as follows:

(1) An ink container to be installed in the main body of the writing instrument comprising a transparent ink container tube of refill type made of a plastic material or the like which is adapted to be directly charged with an ink imparted with pseudo-plasticity and is clogged with a beck-flow preventing material at the tail end thereof, and a pen tip attached at the leading end of the ink container tube and having a ball-point tip formed of German silver or stainless steel as fitted therein;

(2) An ink container comprising a transparent ink container pipe made of a plastic material or the like which is adapted to be directly charged with ink, a ink flow adjusting mechanism such as of bellows type or valve type fittingly attached to the ink container pipe, and a writing tip such as a fiber-bundle tip, nib or hall-point tip made of German silver or stainless steel which is fittingly attached at the leading end of the ink flow adjusting mechanism;

(3) An ink container comprising a transparent ink container pipe made of a plastic material or the like which is adapted to be directly charged with ink, and a pen tip attached at the leading end of the ink container pipe and having a writing tip such as a ball-point tip fitted therein. The ink container is adapted to adjust the ink flow by way of a ball fitted in the ball-point tip by pressure applied to the interior of the ink container pipe when a cap of the writing instrument is fitted around the main body thereof; and (4) An ink container having the same structure as the aforesaid ink container (1) or (2) in which the interior of the ink container tube or ink container pipe is sealed off from the exterior, and the beck-flow preventing material is adapted to move toward the pen tip according to consumption of the ink. The beck-flow preventing material is prepared by gelating a base material such as polybutene with a gelling agent or the like. Alternatively, a rubber or an elastomer presenting a similar effect may be used as the base material.

The excellent concealing power of the aqueous ink composition of the present invention and its coloration ability on black paper are attributable to crystalline particles of the organic white pigment contained therein, unlike the case where a resin emulsion is employed as a coloring agent. This is because the crystalline particles irregularly reflect light rays imparted with a color by a deep color pigment contained in the ink composition on the paper. Further, where the aqueous ink composition is charged in a transparent ink container tube to be installed in the writing instrument of direct ink supply type, the intrinsic color of the ink composition remaining in the ink container tube can be visually observed through the ink container. This is based on the same principle as the above, i.e., the light of the intrinsic color of the ink composition is irregularly reflected by the organic white pigment. Further, the aqueous ink composition ensures long-term stability because the organic white pigment has a specific gravity (1.4) lower than that of titanium oxide (3.9) and hence is less liable to precipitate.

Accordingly, even if a dye is used as a coloring agent in combination with the organic white pigment, the organic white pigment can be properly dispersed. In particular, the effectiveness of the organic white pigment is remarkable where the aqueous ink composition contains a dye or fluorescent colored resin emulsion as a coloring agent and, hence, requires high dispersibility. Further, the combinational use of the organic white pigment and fluorescent colored resin emulsion enhances a fluorescent coloration effect to produce a vivid fluorescent color on black paper. In addition, the enhanced fluorescent coloration effect allows for obvious color recognition of the ink composition in the ink container

EXAMPLES

The present invention will be further detailed byway of examples thereof. Ink compositions in the following Examples 1 to 4 are adapted for use in a ball-pointpen which comprises an ink container pipe formed of polypropylene or the like and adapted to be directly charged with ink, a ball-point tip made of German silver or stainless steel, and an ink flow adjusting mechanism of bellows type provided at the tail end of the ball-point tip. Ink compositions in the following Examples 5 to 8 are adapted for use in a refill-type ball-point pen which comprises an ink container having an ink container tube of polypropylene or the like adapted to be directly charged with an ink (same as an oil ink ball-point pen) and clogged with a back-flow preventing material at the tail end thereof, and a pen tip attached at the leading end of the ink container tube and having a ball-point tip formed of German silver or stainless steel as fitted therein. The ink compositions of Examples 1 to 8 can be applied to writing instruments of direct ink supply type which are preferably used as an aqueous ink ball-point pen.

EXAMPLE 1

| | |
|---|---|
| Copper phthalocyanine blue | 10.0 parts |
| Ethylene-bis-melamine | 1.0 part |
| Sodium salt of styrene-maleic acid copolymer (dispereant) | 3.0 parts |
| Glycerin | 5.0 parts |
| Propylene glycol | 20.0 parts |
| Nonionic active agent (NOIGEN P available from Daiichi Irxiustrial Chemical, Inc.) | 0.5 parts |
| Antiseptic agent (PROXEL XL-2 available from I. C. I Japan Co., Ltd. | 0.5 parts |
| Benzotriazole (rust-preventive agent) | 0.5 parts |
| Water | 59.5 parts |

Copper phthalocyanine blue, ethylene-bis-melamine, sodium salt of styrene-maleic acid copolymer and water were first mixed together for dispersion for one hour by means of a sand mill. The remaining ingredients were then added to the dispersion and dissolved therein by stirring. After adjusted to pH 8 by caustic soda, the resultant dispersion was filtered to obtain a blue ink.

EXAMPLE 2

| | |
|---|---|
| Copper phthalocyanine green | 10.0 parts |
| Ethylene-bis-melamine | 3.0 parts |
| Sodium salt of styrene-acrylic acid copolymer (dispersant) | 3.0 parts |
| Glycerin | 10.0 parts |
| Propylene glycol | 15.0 parts |
| Nonionic active agent (NOIGEN EA112 available from Daiichi Industrial Chemical, Inc.) | 0.3 parts |
| Antiseptic agent (PROXEL XL-2 available from I. C. I. Japan Co., Ltd.) | 0.5 parts |
| Benzotriazole (rust-preventive agent) | 0.5 parts |
| Water | 57.7 parts |

Copper phthalocyanine green, ethylene-bis-melamine, sodium salt of styrene-acrylic acid copolymer and water were first mixed together for dispersion for one hour by means of a sand mill. The remaining ingredients were then added to the dispersion and dissolved therein by stirring. After adjusted to pH 8 by caustic soda, the resultant dispersion was filtered to obtain a green ink.

EXAMPLE 3

| | |
|---|---|
| Dioxazine violet | 5.0 parts |
| Ethylene-bis-melamine | 1.0 part |
| Sodium salt of styrene-acrylic acid copolymer (dispersant) | 1.0 part |
| Glycerin | 5.0 parts |
| Propylene glycol | 20.0 parts |
| Anionic active agent (ECTD-3NEX available from Japan Surfactant Co., Ltd.) | 0.3 parts |
| Antiseptic agent (PROXEL XL-2 available from I. C. I. Japan Co., Ltd.) | 0.5 parts |
| Benzotriazole (rust-preventive agent) | 0.5 parts |
| Water | 66.7 parts |

Dioxazine violet, ethylene-bis-melamine, sodium salt of styrene-acrylic acid copolymer and water were first mixed together for dispersion for one hour by means of a sand mill. The remaining ingredients were then added to the dispersion and dissolved therein by stirring. After adjusted to pH 8 by caustic soda, the resultant dispersion was filtered to obtain a violet ink.

EXAMPLE 4

| | |
|---|---|
| Water blue #9 (food color blue No. 1) | 6.0 parts |
| Ethylene-bis-melamine | 10.0 parts |
| Sodium salt of styrene-maleic acid copolymer (dispersant) | 2.0 parts |
| Glycerin | 5.0 parts |
| Propylene glycol | 15.0 parts |
| Anionic active agent (ECTD-3NEX available from Japan Surfactant Co., Ltd.) | 0.3 parts |
| Antiseptic agent (PROXEL XL-2 available from I. C. I. Japan Co., Ltd.) | 0.5 parts |
| Benzotriazole (rust-preventive agent) | 0.5 parts |
| Water | 60.7 parts |

Ethylene-bis-melamine, sodium salt of styrene-maleic acid copolymer and water were first mixed together for dispersion for one hour by means of a sand mill. The remaining ingredients were then added to the dispersion and dissolved therein by stirring. After adjusted to pH 8 by caustic soda, the resultant dispersion was filtered to obtain a blue ink.

EXAMPLE 5

| | |
|---|---|
| Copper phthalocyanine blue | 4.0 parts |
| Ethylene-bis-melamine | 1.0 part |
| Sodium salt of styrene-acrylic acid copolymer (dispersant) | 1.0 part |
| Crosslinked acrylic resin (3% aqueous solution of CARBOPOL (available from B. F. Goodrich, Inc.) neutralized with equivalent NaOH) | 4.0 parts |
| Propylene glycol | 10.0 parts |
| Glycerin | 5.0 parts |
| Antiseptic agent (PROXEL XL-2 available from I. C. I. Japan Co., Ltd.) | 0.5 parts |
| Benzotriazole (rust-preventive agent) | 0.5 parts |
| Xanthan gum (pseudo-plasticity formation agent, KELZAN available from Sansho Co., Ltd.) | 0.3 parts |
| Water | 73.7 parts |

Xanthan gum was added little by little to 30 parts of water to avoid formation of undissolved lump of xanthan gum and completely dissolved therein by stirring. A mixture of copper phthalocyanine blue, ethylene-bis-melamine, sodium salt of styrene-acrylic acid copolymer and 43.7 parts of water was stirred for dispersion for one hour by means of a sand mill. The remaining ingredients were added to the dispersion and dissolved therein by stirring. Then, the dispersion was added to the xanthane gum solution, and dispersed by stirring for one hour. After adjusted to pH 8 by caustic soda, the resultant dispersion was filtered to obtain a blue ink.

EXAMPLE 6

| | |
|---|---|
| Copper phthalocyanine green | 4.0 parts |
| Ethylene-bis-melamine | 2.5 parts |
| Sodium salt of styrene-acrylic acid copolymer (dispersant) | 1.0 part |
| Propylene glycol | 10.0 parts |
| Glycerin | 5.0 parts |
| Antiseptic agent (PROXEL XL-2 available from I. C. I. Japan Co., Ltd.) | 0.5 parts |
| Benzotriazole (rust-preventive agent) | 0.5 parts |
| Xanthan gum (pseudo-plasticity formation agent, KELZAN available from Sansho Co., Ltd) | 0.3 parts |
| Water | 76.2 parts |

Xanthan gum was added little by little to 30 parts of water to avoid formation of undissolved lump of xanthan gum and completely dissolved therein by stirring. A mixture of copper phthalocyanine green, ethylene-bis-melamine, sodium salt of styrene-acrylic acid copolymer and 46.2 parts of water was stirred for dispersion for one hour by means of a sand mill. The remaining ingredients were added to the dispersion and dissolved therein by stirring. Then, the dispersion was added to the xanthane gum solution, and dispersed by stirring for one hour. After adjusted to pH 8 by caustic soda, the resultant dispersion was filtered to obtain a green ink.

EXAMPLE 7

| | |
|---|---|
| Quinacridone red | 4.0 parts |
| Ethylene-bis-melamine | 2.0 parts |
| Sodium salt of styrene-acrylic acid copolymer (dispersant) | 1.0 part |
| Glycerin | 5.0 parts |
| Propylene glycol | 10.0 parts |
| Antiseptic agent (PROXEL XL-2 available from I. C. I. Japan Co., Ltd.) | 0.5 parts |
| Benzotriazole (rust-preventive agent) | 0.5 parts |
| Potassium oleate | 0.1 parts |
| Weran gum (pseudo-plasticity formation agent available from Sanhso Co., Ltd.) | 0.3 parts |
| Water | 76.6 parts |

Weran gum was added little by little to 30 parts of water to avoid formation of undissolved lump of weran gum and completely dissolved therein by stirring. A mixture of quinacridone red, ethylene-bis-melamine, sodium salt of styrene-acrylic acid copolymer and 46.6 parts of water was stirred for dispersion for one hour by means of a sand mill. The remaining ingredients were added to the dispersion and dissolved therein by stirring. Then, the dispersion was added to the weran gum solution, and dispersed by stirring for one hour. After adjusted to pH 8 by caustic soda, the resultant dispersion was filtered to obtain a pink ink.

EXAMPLE 8

| | |
|---|---|
| Dioxazine violet | 3.0 parts |
| Ethylene-bis-melamine | 5.0 parts |
| Sodium salt of styrene-acrylic acid copolymer (dispersant) | 2.0 parts |
| Propylene glycol | 10.0 parts |
| Glycerin | 5.0 parts |
| Antiseptic agent (PROXEL XL-2 available from I. C. I. Japan Co., Ltd.) | 0.5 parts |
| Benzotriazole (rust-preventive agent) | 0.5 parts |
| Xanthan gum (pseudo-plasticity formation agent, CHELZAN available from Sansho Co., Ltd.) | 0.3 parts |
| Water | 73.7 parts |

Xanthan gum was added little by little to 30 parts of water to avoid formation of undissolved lump of Xanthan gum and completely dissolved therein by stirring. A mixture of dioxazine violet, ethylene-bis-melamine, sodium salt of styrene-acrylic acid copolymer and 43.7 parts of water was stirred for dispersion for one hour by means of a sand mill. The remaining ingredients were added to the dispersion and dissolved therein by stirring. The dispersion was added to the xanthane gum solution, and dispersed by stirring for one hour. After adjusted to pH 8 by caustic soda, the resultant dispersion was filtered to obtain a violet ink.

COMPARATIVE EXAMPLE 1

A blue ink was prepared in substantially the same manner as described in Example 1, except that ethylene-bis-melamine was replaced with the equivalent amount of titanium oxide.

COMPARATIVE EXAMPLE 2

A green ink was prepared in substantially the same manner as described in Example 2, except that ethylene-bis-melamine was replaced with the equivalent amount of titanium oxide.

COMPARATIVE EXAMPLE 3

A blue ink was prepared in substantially the same manner as described in Example 1, except that ethylene-bis-melamine was replaced with the equivalent amount of ion-exchanged water.

COMPARATIVE EXAMPLE 4

A green ink was prepared in substantially the same manner as described in Example 2, except that ethylene-bis-melamine was replaced with the equivalent amount of ion-exchanged water.

COMPARATIVE EXAMPLE 5

A blue ink was prepared in substantially the same manner as described in Example 5, except that ethylene-bis-melamine was replaced with the equivalent amount of titanium oxide.

COMPARATIVE EXAMPLE 6

A green ink was prepared in substantially the same manner as described in Example 6, except that ethylene-bis-melamine was replaced with the equivalent amount of titanium oxide.

COMPARATIVE EXAMPLE 7

A blue ink was prepared in substantially the same manner as described in Example 5, except that ethylene-bis-melamine was replaced with the equivalent amount of ion-exchanged water.

COMPARATIVE EXAMPLE 8

A green ink was prepared in substantially the same manner as described in Example 6, except that ethylene-bis-melamine was replaced with the equivalent amount of ion-exchanged water.

Each of the aqueous ink compositions prepared in Examples 1 to 4 and Comparative Examples 1 to 4 was directly filled in an ink container pipe made of polypropyrene. Then, a pen tip including a ball-point tip made of German silver or stainless steel and an ultra hard ball having a diameter of 0.6 mm was attached to the ink container pipe. The pen tip was provided with an ink flow adjusting device of bellows type fitted at the tail end of thereof. Thus, an aqueous ink ball-point pen (writing instrument of direct ink supply type) was prepared.

Each of the aqueous ink compositions prepared in Examples 5 to 8 and Comparative Examples 5 to 8 was directly filled in a refill including a polypropyrene container tube, and a pen tip and a ball-point tip pressedly fitted therein. After clogged with a back-flow preventing material at the tail end thereof, the refill was centrifuged for deaeration. Thus, an aqueous ink ball-point pen of refill type (writing instrument of direct ink supply type) was prepared.

These aqueous ink ball-point pens (writing instrument of direct ink supply type) were subject to the following tests. Visual inspections were carried out first to determine if characters written on black paper with the respective ball-point pens could be visually recognized under natural light (indoor in the daytime), and then to determine if the colors of the ink compositions contained in the respective ball-point pens could be recognized under natural light (indoor in the daytime). The ball-point pens respectively containing the aqueous ink compositions prepared in Examples 1 to 8 and Comparative Examples 1 to 8 with caps being attached thereto were allowed to stand for one month in a thermostatic chamber at a temperature of 50° C. with the pen tips thereof oriented downward. Thereafter, using a spiral-type writing tester, lines of 100 m were drawn with the respective ball-point pens under conditions of writing angle=65°C., load=100 g, and writing speed=7 cm/sec to observe a change in the ink flow before and after the ball-point pens were kept in the thermostatic chamber. The test results are shown in Table 1.

TABLE 1

| Ink | Recognizability on black paper | Visual color of ink container | Change in writing characteristics before and after storage in 50° C. thermostat for 1 month |
| --- | --- | --- | --- |
| Ex. 1 | Recognizable | Blue | No change, excellent |
| Ex. 2 | Recognizable | Green | No change, excellent |
| Ex. 3 | Recognizable | Violet | No change, excellent |
| Ex. 4 | Recognizable | Blue | No change, excellent |
| Ex. 5 | Recognizable | Blue | No change, excellent |
| Ex. 6 | Recognizable | Green | No change, excellent |
| Ex. 7 | Recognizable | Pink | No change, excellent |
| Ex. 8 | Recognizable | Violet | No change, excellent |
| Comp. Ex. 1 | Recognizable | Blue | Disabled after storage in 50° C. thermostat |
| Comp. Ex. 2 | Recognizable | Green | Dinabled after storage in 50° C. thermostat |
| Comp. Ex. 3 | Unrecognizable | Black | No change, excellent |
| Comp. Ex. 4 | Unrecognizable | Black | No change, excellent |
| Comp. Ex. 5 | Recognizable | Blue | Disabled after storage in 50° C. thermostat |
| Comp. Ex. 6 | Recognizable | Green | Disabled after storage in 50° C. thermostat |
| Comp. Ex. 7 | Unrecognizable | Black | No change, excellent |
| Comp. Ex. 8 | Unrecognizable | Black | No change, excellent |

As for recognizibility on black paper shown in Table 1, "recognizable" means that the ink on the black paper exhibited the intrinsic color thereof whereby the characters written on the black paper could be visually recognized. On the other hand, "unrecognizable" means that the intrinsic color of the ink was assimilated with the black of the paper whereby the characters written on the black paper could not be visually recognized. As for visual color shown in Table 1, "black" means that the intrinsic color of the ink could not be visually recognized through the ink container, while a color other than black means that the intrinsic color of the ink could be visually recognized through the ink container. As for change in writing characteristics shown in Table 1, "no change, excellent" means that the ink flow was substantially the same before and after the bell-point pen was stored in the thermostat chamber at a temperature of 50° C. for one month, whereas "disabled after storage in 50° C. thermostatic" means that the ball-point pen did not exhibit the normal writing characteristics after the storage.

As can be understood from the foregoing, the aqueous ink composition according to the present invention can exhibit the intrinsic color thereof even on black paper, thereby allowing for obvious recognition of the intrinsic color thereof. Further, the present invention allows a deep color ink composition to be visually recognized through the transparent ink container tube or ink container pipe (refill-type) of the ink container. Yet further, the ink composition of the present invention advantageously assures a long-term stability and is free from deterioration in writing characteristics.

Next, aqueous ink compositions for use in a writing instrument of wick type were examined. The writing instrument comprised a wick formed of a bundle of fibers with its periphery covered with a resin and impregnated with an ink composition, from which the ink composition was supplied to a pen tip having a hall-point tip or a felt tip through capillarity. Such aqueous ink compositions were prepared in Examples 11 to 15.

EXAMPLE 11

| | |
| --- | --- |
| Copper phthalocyanine blue | 6.0 parts |
| Titanium oxide | 6.0 parts |
| Ethylene-bis-melamine | 8.0 parts |
| Dispersent resin | 18.0 parts |
| (JOHNCRYL J-62 available from Johnson, Inc.) | |
| Propylene glycol | 3.0 parts |
| Anionic active agent | 1.0 part |
| (NEOCOL YSK available from Daiichi Industrial Chemical, Inc.) | |
| Antiseptic agent | 0.1 parts |
| (PROXEL XL-2 available from I.C.I. Japan Co., Ltd.) | |
| Antifungal agent | 0.2 parts |
| (COATIDE H available from Takeda Chemical Industries, Ltd.) | |
| Water | 57.7 parts |

Copper phthalocyanine blue, titanium oxide and ethylene-bis-melamine were dispersed in a mixture consisting of 6 parts of the dispersant resin and 18 parts of water for one hour by means of a sand mill. Then, the remaining ingredients were added to the dispersion and dissolved therein by stirring. A blue ink was obtained after the resultant dispersion was adjusted to pH 8 by an ammonia solution.

EXAMPLE 12

| | |
| --- | --- |
| Copper phthalocyanine green | 5.0 parts |
| Titanium oxide | 8.0 parts |
| Ethylene-bis-melamine | 8.0 parts |
| Dispersant resin | 18.0 parts |
| (JOHNCRYL J-62 available from Johnson, Inc.) | |
| Propylene glycol | 3.0 parts |
| Anionic active agent | 1.0 part |
| (NEOCOL YSK available frm Daiichi Industrial Chemical, Inc.) | |
| Antiseptic agent | 0.1 parts |
| (PROXEL XL-2 available from I.C.I. Japan Co., Ltd.) | |
| Antifungal agent | 0.2 parts |
| (COATIDE B available from Takeda Chemical Industries, Ltd.) | |
| Water | 56.7 parts |

Copper phthalocyanine green, titanium oxide and ethylene-bis-melamine were dispersed in a mixture consisting of 6 parts of the dispersant resin and 18 parts of water for one hour by means of a sand mill. Then, the remaining ingredients were added to the dispersion and dissolved therein by stirring. A green ink was obtained after the resultant dispersion was adjusted to pH 9 by an ammonia solution.

EXAMPLE 13

| | |
|---|---|
| Quinacridone red | 7.0 parts |
| Titanium oxide | 4.0 parts |
| Ethylene-bis-melamine | 6.0 parts |
| Dispersant resin (JOHNCRYL J-62 available from Johnson, Inc.) | 18.0 parts |
| Propylene glycol | 3.0 parts |
| Anionic active agent (NEOCOL YSK available from Daiichi Industrial Chemical, Inc.) | 1.0 part |
| Antiseptic agent (PROXEL XL-2 available from I.C.I. Japan Co., Ltd.) | 0.1 parts |
| Antifungal agent (COATIDE H available from Takeda Chemical Industries, Ltd.) | 0.2 parts |
| Water | 60.7 parts |

Quinacridone red, titanium oxide and ethylene-bis-melamine were dispersed in a mixture consisting of 6 parts of the dispersant resin and 18 parts of water for one hour by means of a sand mill. The mining ingredients were then added to the dispersion and dissolved therein by stirring. A pink ink was obtained after the resultant dispersion was adjusted to pH 10 by an ammonia solution.

EXAMPLE 14

| | |
|---|---|
| Dioxazine violet | 4.0 parts |
| Titanium oxide | 7.0 parts |
| Ethylene-bis-melamine | 10.0 parts |
| Dispersant resin (JOHNCRYL J-62 available from Johnson, Inc.) | 24.0 parts |
| Propylene glycol | 3.0 parts |
| Anionic active agent (NEOCOL YSK available from Daiichi Industrial Chemical, Inc.) | 1.0 part |
| Antiseptic agent (PROXEL XL-2 available from I.C.I. Japan Co., Ltd.) | 0.1 parts |
| Antifungal agent (COATIDE B available from Takeda Chemical Industries, Ltd.) | 0.2 parts |
| Water | 50.7 parts |

Dioxazine violet, titanium oxide and ethylene-bis-melamine were dispersed in a mixture consisting of 6 parts of the dispersant resin and 18 parts of water for one hour by means of a sand mill. The remaining ingredients were then added to the dispersion and dissolved therein by stirring. A violet ink was obtained after the resultant dispersion was adjusted to pH 8 by an ammonia solution.

EXAMPLE 15

| | |
|---|---|
| Titanium oxide | 10.0 parts |
| Ethylene-bis-melamine | 20.0 parts |
| Dispersant resin (JOHNCRYL J-62 available from Johnson, Inc.) | 18.0 parts |
| Propylene glycol | 3.0 parts |
| Anionic active agent (NEOCOL YSK available from Daiichi Industrial Chemical, Inc.) | 1.0 part |
| Antiseptic agent (PROXEL XL-2 available from I.C.I. Japan Co., Ltd.) | 0.1 parts |
| Antifungal agent (COATIDE H available from Takeda Chemical Industries, Ltd.) | 0.2 parts |
| Water | 50.7 parts |

Titanium oxide and ethylene-bis-melamine were dispersed in a mixture consisting of 6 parts of the dispersant resin and 18 parts of water for one hour by means of a sand mill. The remaining ingredients were then added to the dispersion and dissolved therein by stirring. A white ink was obtained after the resultant dispersion was adjusted to pH 9 by an ammonia solution.

COMPARATIVE EXAMPLE 11

A blue ink was prepared in substantially the same manner as described in Example 11, except that ethylene-bis-melamine was replaced with the equivalent amount of hollow resin particles (GRANDOIL PP2000S available from Dainippon Ink & Chemicals, Inc.).

COMPARATIVE EXAMPLE 12

A green ink was prepared in substantially the same manner as described in Example 12, except that ethylene-bis-melamine was replaced with the equivalent amount of hollow resin particles (GRANDOIL PP2000S available from Dainippon Ink & Chemicals, Inc.).

COMPARATIVE EXAMPLE 13

A pink ink was prepared in substantially the same manner as described in Example 13, except that ethylene-bis-melamine was replaced with the equivalent amount of hollow resin particles (GRANDOLL PP2000S available from Dainippon Ink & Chemicals, Inc.).

The aqueous ink compositions prepared in Examples 11 to 15 and Comparative Examples 11 to 13 were each impregnated in the wick of the wick-type writing instrument to be subjected to the following tests. The concealing power of each ink composition was evaluated by visually inspecting lines drawn on art paper having black lines printed thereon with a writing instrument containing the ink composition. An ink composition completely concealing the black lines was evaluated as "acceptable", while an ink composition which did not completely conceal the black lines was evaluated as "unacceptable". For evaluation of the long-term stability of the ink compositions, the writing instruments were allowed to stand with the pen tips thereof oriented upward or downward at the temperature of 50° C. for one month. The ink density on paper was observed before and after the one-month storage at a temperature of 50° C., and the difference between the initial density and that after the one-month storage was examined by comparison. An ink composition which did not present a noticeable difference was evaluated as "no change", whereas an ink composition which presented a noticeable difference was evaluated as "some change". The results are shown in Table 2.

TABLE 2

| Ink | Concealing Power | Change in ink density before and after one-month storage at 50° C. | |
|---|---|---|---|
| | | Pen tip upward | Pen tip downward |
| Ex. 11 | Acceptable | No change | No change |
| Ex. 12 | Acceptable | No change | No change |
| Ex. 13 | Acceptable | No change | No change |
| Ex. 14 | Acceptable | No change | No change |
| Ex. 15 | Acceptable | No change | No change |
| Comp. Ex. 11 | Unacceptable | Some change | Some change |
| Comp. Ex. 12 | Unacceptable | Some change | Some change |
| Comp. Ex. 13 | Unacceptable | Some change | Some change |

As is apparent from Table 2, the aqueous ink compositions of the present invention for use in the wick-type writing instruments are also excellent in concealing power and long-term, stability.

For application to the writing instruments of direct ink supply type, the content of the organic white pigment is preferably 1% by weight to 20% by weight with respect to the total amount of the ink composition. If the content is less than 1% by weight, the resultant ink composition does not exhibit a satisfactory coloration effect. On the other hand, if the content exceeds 20% by weight, the resultant ink composition has an excessive viscosity, resulting in deterioration in writing smoothness. This is because ink compositions for use in the writing instruments of direct ink supply type may contain a pseudo-plasticity formation agent. Unlike the ink compositions for the writing instruments of direct ink supply type, an ink composition for use in the wick-type writing instrument rarely includes the pseudo-plasticity formation agent and, therefore, the content thereof is preferably 1% by weight to 40% by weight, more preferably 5% by weight to 25% by weight with respect to the total amount of the ink composition. If the content is less than 1 % by weight, the resultant ink composition does not present a satisfactory concealing power. If the content exceeds 40% by weight, the resultant ink composition has an increased viscosity, resulting in deterioration in writing smoothness.

Though the aforesaid examples employ the organic white pigment of ethylene-bis-melamine which is one of exemplary alkylene-bis-melamine derivatives represented by the general formula (1), the following compounds may exhibit substantially the same effects as in the aforesaid examples: a compound wherein R is replaced with a lower alkyl group having 1 to 4 carbon atoms or an alicyclic group, instead of a hydrogen atom; a compound wherein R1, R2, R3 and R4 are the same or different, each representing a hydrogen atom or a lower alkyl group having 1 to 4 carbon atoms; an alkylene-bis-melamine derivative wherein R1 and R2, or R3 and R4 fore a heterocyclic group together with a nitrogen atom; and a propylene-bis-melamine wherein X represents a lower alkylene group having 3 carbon atoms and the derivatives thereof.

What is claimed is:

1. An aqueous ink composition comprising an aqueous ink mixture containing at least a coloring agent, a pigment dispersant, a water-soluble organic solvent and water, and an organic white pigment of an alkylene-bis-melamine derivative represented by the general formula (1):

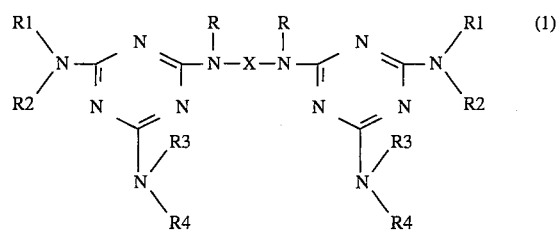

wherein R represents a hydrogen atom, a lower alkyl group having 1 to 4 carbon atoms or an alicyclic group; R1, R2, R3 and R4 are the same or different, each representing a hydrogen atom or a lower alkyl group having 1 to 4 carbon atoms; R1 and R2, or R3 and R4 may form a heterocyclic group together with nitrogen atom; and X represents a lower alkylene group having 2 to 3 carbon atoms.

2. An aqueous ink composition as set forth in claim 1, wherein said organic white pigment is ethylene-bis-melamine.

3. An aqueous ink composition as set forth in claim 1, wherein said coloring agent is a pigment.

4. An aqueous ink composition as set forth in claim 3, wherein said pigment is titanium oxide.

5. An aqueous ink composition as set forth in claim 1, wherein said coloring agent is a fluorescent colored resin emulsion.

6. An aqueous ink composition as set forth in claim 1, wherein said pigment dispersant is selected from an alkali salt, ammonia salt and amine salt of α-methylstyrene-styrene acrylic acid copolymer.

7. A writing instrument of direct ink supply type comprising an ink container directly charged with an aqueous ink composition as recited in claim 1.

8. A writing instrument as set forth in claim 7, wherein said aqueous ink composition includes about 1% to about 20% by weight of an organic white pigment as recited in claim 1 with respect to the total amount of said ink composition.

9. A writing instrument of wick type comprising a wick impregnated with an aqueous ink composition as recited in claim 1.

10. A writing instrument as set forth in claim 9, wherein said ink composition includes about 1% to about 40% by weight of an organic white pigment as recited in claim 1 with respect to the total amount of said ink composition.

* * * * *